US010785224B2

(12) United States Patent
Kallman et al.

(10) Patent No.: US 10,785,224 B2
(45) Date of Patent: Sep. 22, 2020

(54) SYSTEM AND METHOD FOR EVENT MANAGEMENT

(71) Applicant: Veeva Systems Inc.

(72) Inventors: Daniel Kallman, Foster City, CA (US); Shoaib Sultan, San Ramon, CA (US); Srinivasa S. Davuluri, San Ramon, CA (US); Ling Lam, Fremont, CA (US); Jay H. Hartley, San Ramon, CA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 15/853,344

(22) Filed: Dec. 22, 2017

(65) Prior Publication Data

US 2019/0199724 A1  Jun. 27, 2019

(51) Int. Cl.
*H04L 29/06* (2006.01)
*G06Q 30/02* (2012.01)
*G06F 9/54* (2006.01)

(52) U.S. Cl.
CPC .............. *H04L 63/10* (2013.01); *G06F 9/542* (2013.01); *G06Q 30/02* (2013.01)

(58) Field of Classification Search
None
See application file for complete search history.

(56) References Cited

U.S. PATENT DOCUMENTS

| | | | | |
|---|---|---|---|---|
| 10,169,427 B2* | 1/2019 | Aaron | ................. | G06F 16/2465 |
| 2004/0122772 A1* | 6/2004 | Schirmer | ............... | G06Q 10/10 |
| | | | | 705/50 |
| 2007/0265902 A1* | 11/2007 | Brennen | ................ | G06Q 10/06 |
| | | | | 705/7.19 |
| 2008/0082827 A1* | 4/2008 | Agrawal | ................. | H04L 63/10 |
| | | | | 713/176 |
| 2010/0131574 A1* | 5/2010 | Reese | ................. | G06F 3/04842 |
| | | | | 707/812 |
| 2010/0198644 A1* | 8/2010 | Renfro | ............... | G06Q 10/0631 |
| | | | | 705/7.19 |
| 2011/0150200 A1* | 6/2011 | Uhler | .................. | H04M 7/0027 |
| | | | | 379/202.01 |
| 2012/0066326 A1* | 3/2012 | Soderstrom | ......... | H04L 12/1818 |
| | | | | 709/206 |
| 2013/0218882 A1* | 8/2013 | McConnell | ....... | G06F 16/24524 |
| | | | | 707/728 |
| 2013/0324005 A1* | 12/2013 | Ferreyra | .................. | A63H 1/02 |
| | | | | 446/259 |
| 2014/0267566 A1* | 9/2014 | Hamada | .................... | H04N 7/15 |
| | | | | 348/14.08 |
| 2015/0100363 A1* | 4/2015 | Bishop | ................ | G06F 17/2705 |
| | | | | 705/7.15 |

(Continued)

*Primary Examiner* — Joshua Joo

(57) ABSTRACT

The event management system described is capable of aligning controlled content in a controlled content repository to properties of an event, e.g., event type, event topic, geographic location and product involved. When a user creates an event, controlled content associated with the event properties may be displayed so that the user may choose proper content for the event. When event content is updated in the controlled content repository, the latest version is pushed to the speaker so that only the latest version of the controlled content can be shared. Content displayed during a webinar and attendee participation data for the webinar may be tracked and stored in a CRM system.

18 Claims, 7 Drawing Sheets

(56) References Cited

U.S. PATENT DOCUMENTS

| | | | |
|---|---|---|---|
| 2016/0191557 A1* | 6/2016 | Maor | G06F 21/56 |
| | | | 726/23 |
| 2017/0099297 A1* | 4/2017 | Armer | H04L 63/105 |
| 2017/0099361 A1* | 4/2017 | Digilov | H04L 67/24 |
| 2017/0102912 A1* | 4/2017 | Jambulingam | G09B 5/08 |
| 2017/0118271 A1* | 4/2017 | Reyes | H04L 67/06 |
| 2017/0206213 A1* | 7/2017 | Gilady | G06Q 10/00 |
| 2017/0220535 A1* | 8/2017 | Olsen | G06F 17/24 |
| 2017/0316383 A1* | 11/2017 | Naganathan | G06Q 10/1095 |
| 2018/0109636 A1* | 4/2018 | Hardy | H04L 67/18 |
| 2018/0131681 A1* | 5/2018 | Husser | G06F 21/10 |
| 2018/0167438 A1* | 6/2018 | Choi | H04L 43/045 |

* cited by examiner

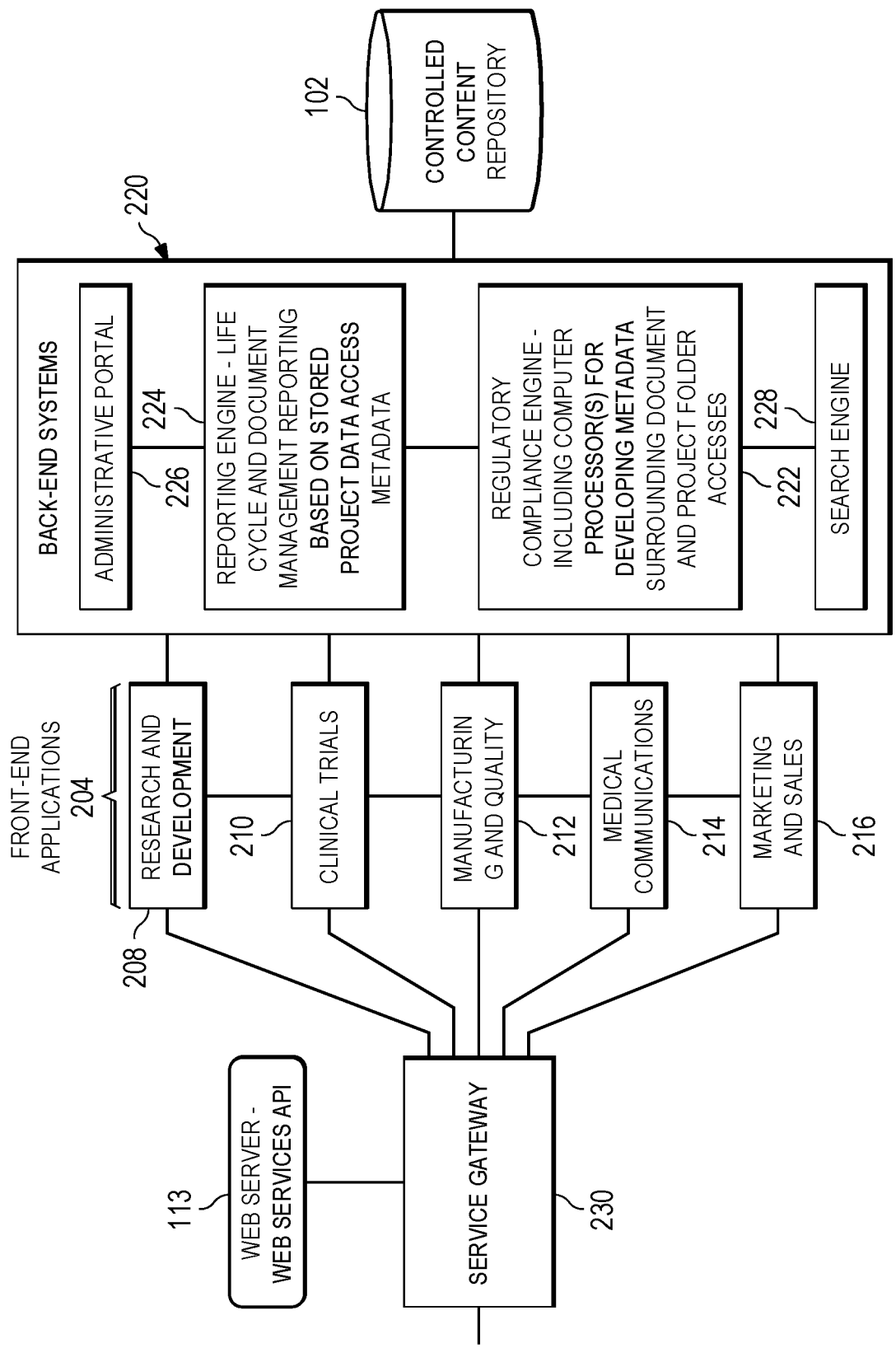

FIG. 4

SYSTEM AND METHOD FOR EVENT MANAGEMENT

CROSS-REFERENCE TO RELATED APPLICATION

U.S. Pat. No. 9,055,023, entitled System and Method for Controlling Electronic Communications and issued on Jun. 9, 2015, is hereby incorporated by reference herein for all purposes.

TECHNICAL FIELD

The present application relates to systems and methods for managing events in the life science industry.

BACKGROUND

In certain fields, the ability to achieve the efficiencies associated with modern electronic communications such as webinar has been hampered by the risks (regulatory and otherwise) of sharing the content. An example of one field that has been so limited has been the life science industry, where speakers typically are strictly regulated when sharing content with prescribing doctors because of the enormous risks that can flow from unapproved, uncontrolled content.

SUMMARY

Embodiments disclosed in the present document provide a machine-implemented method for event management. The method comprises: establishing a controlled content repository, the controlled content repository being securely and controllably accessed. The method further comprises: establishing an access protocol for the controlled content repository, receiving an input for approving an item of content to be shared during a first event; and storing approved content within the controlled content repository, whereby the approved content is stored in the controlled content repository according to the access protocol and whereby the access protocol comprises at least one set of alignment rules for determining if a first item of approved content within the controlled content repository can be made available to a first customer. The method further comprises: associating a first item of approved content within the controlled content repository with a first value of a first event property of the first event from an information management system.

BRIEF DESCRIPTION OF THE DRAWINGS

For a more complete understanding of the present application and its advantages, reference is now made to the following description taken in conjunction with the accompanying drawings, in which like reference numbers indicate like features.

FIG. 2 illustrates an example architecture for the content repository of FIG. 1 in which content is built and organized in a controlled manner that facilitates efficient content generation and alignment;

Figure 4:
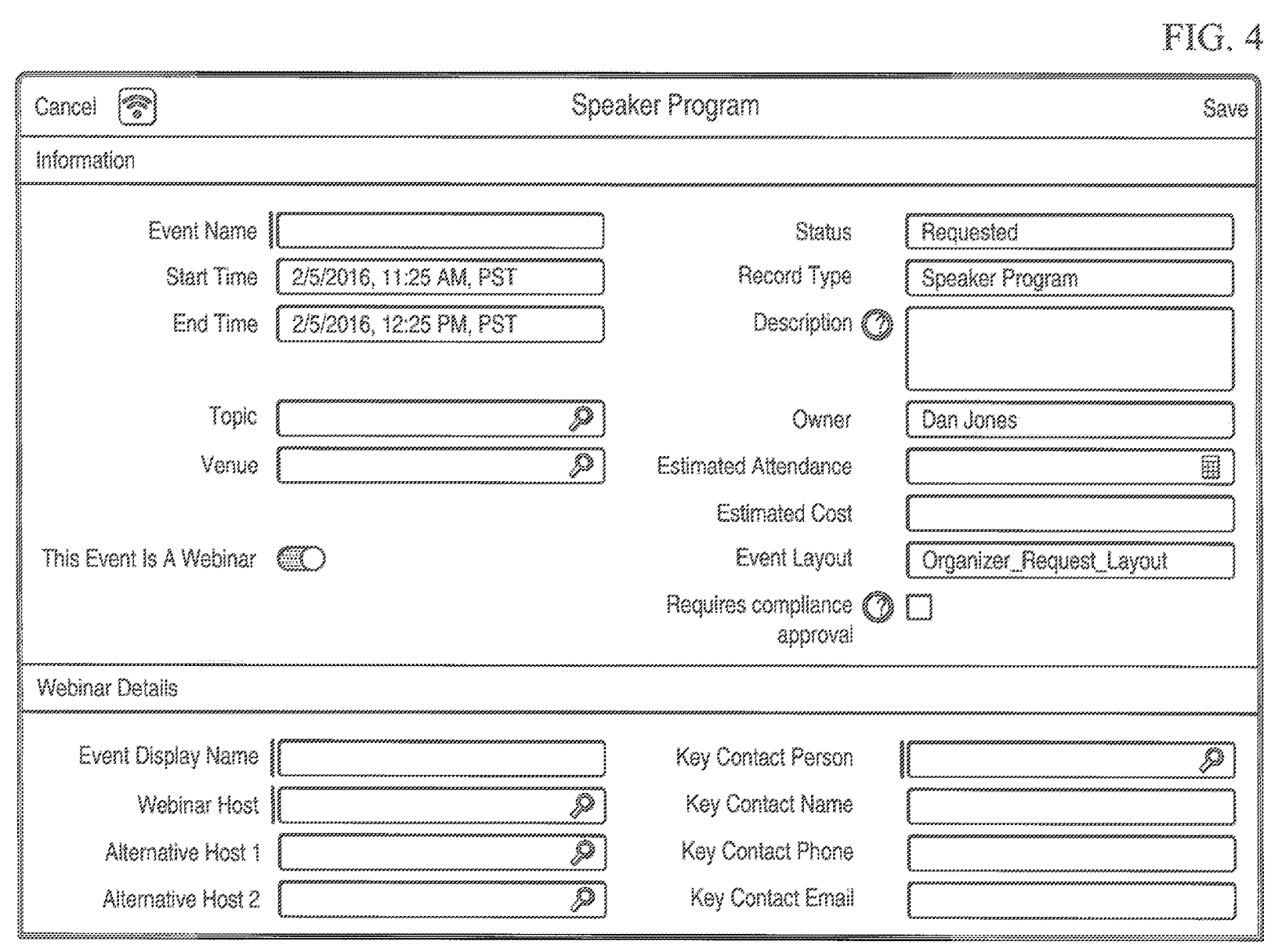

FIG. 4 illustrates an example of a user interface for creating a webinar for an event.

Although similar reference numbers may be used to refer to similar elements for convenience, it can be appreciated that each of the various example embodiments may be considered to be distinct variations.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

In disclosed embodiments, intelligent and flexible updating of records may be provided within the customer relationship management subsystem, including such approaches as communicating with third-party systems and sources in order to verify and update customer information in an effective and timely manner, such as by using the collective information gained by managing a cloud-based system/Software-as-a-Service (SaaS) system on behalf of multiple company customers for the disclosed embodiments.

Figure 1:
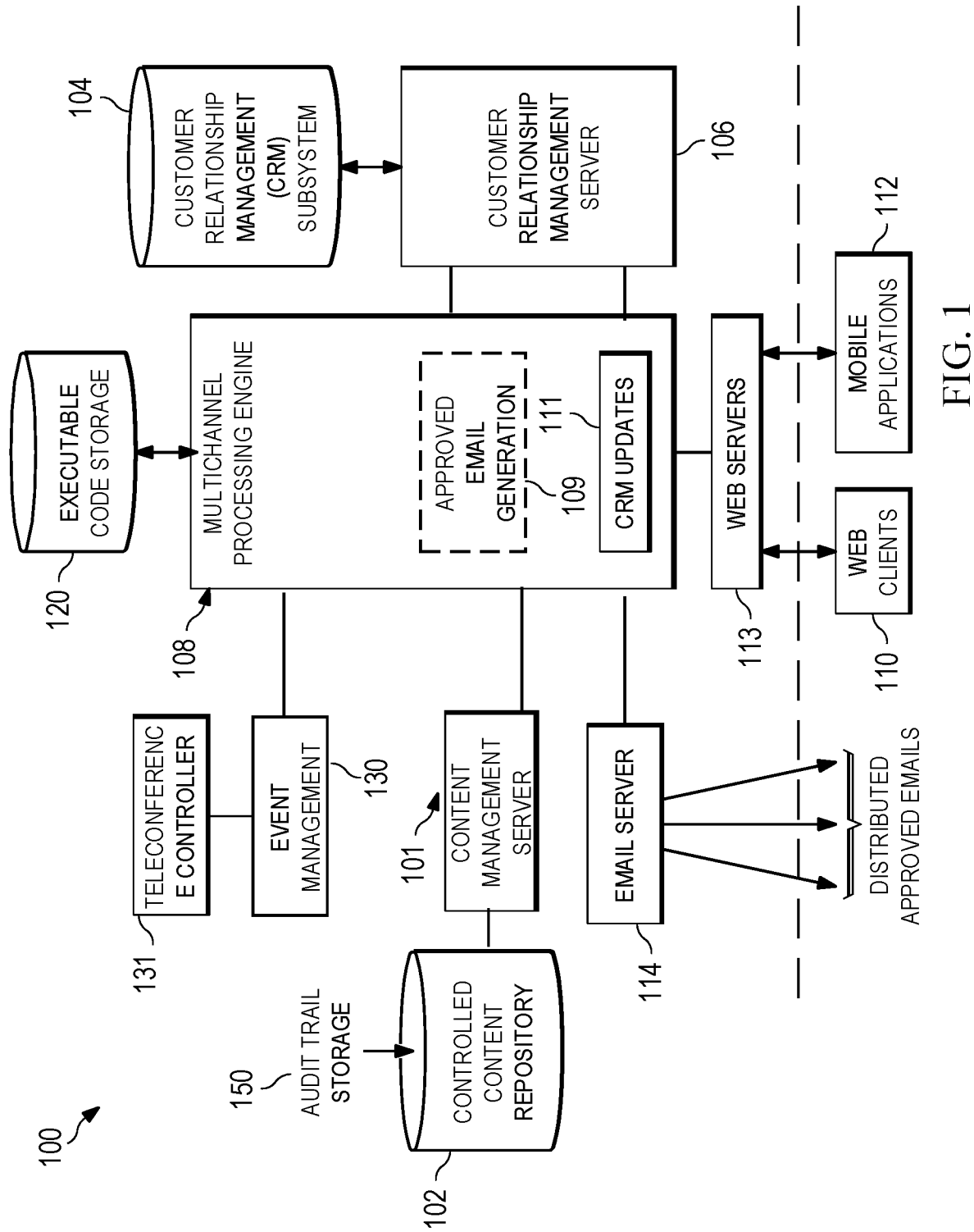
FIG. 1 illustrates an exemplary architecture for managing events.

FIG. 1 is a system overview illustrating an embodiment of an event management system 100. The presently disclosed embodiment comprises a content management server 101, a controlled content repository 102, a Customer Relationship Management (CRM) server 106, a multichannel processing engine 108, and an event management controller 130. The customer relationship management server 106 may provide access to a customer relationship management subsystem 104, and the multichannel processing engine 108 may be coupled to the content management server 101, the CRM server 106, and an email server 114. In one embodiment, the customer relationship management subsystem 104, the teleconference controller 131, and/or the email server 114 may be operated by a third party. The multichannel processing engine 108 may be accessed by users such as company sales representatives through web clients 110 or through mobile apps 112 (such as iOS, Android, Blackberry, or Windows Mobile systems), communicating with the multichannel processing engine 108 through web servers 113. Although the users may be described in the present application as being life science webinar speakers and company sales representatives, this particular described embodiment is not intended to limit the generality of the claims that may eventually issue in patents stemming from the present disclosure.

The controlled content repository 102 is designed to have a process for developing approved content that is sharable across multiple users, such as shareholders, reviewers, managers, marketing personnel, physicians, sales representatives, etc. The content generated in the controlled content repository 102 may be accessed on a regulated basis. This regulated basis may be determined, in part, by the company as a whole and additionally by interaction with data from the customer relationship management subsystem 104, described in further detail below. In one embodiment, approved content, customer profile information, customer preferences, and regulatory limitations and requirements may be stored in a table in the controlled content repository 102. In addition to storage and development of content, the controlled content repository 102 may also store an audit trail, tracking exact content of communications as they were sent by the user, as well as metadata about webinars regarding the content shared with customers.

The customer relationship management subsystem 104 contains all contact information that may be available to users. In addition to storage of contact information, the customer relationship management subsystem 104 may also be capable of storing configurations regarding specific preferences, regulatory limitations and requirements, and other fields that will facilitate the generation of appropriate approved electronic communications, in general or on a by-recipient basis. These preferences and/or requirements include both the preferences of the user (e.g., maintaining account lists) as well as the preferences of the enterprise (e.g., employers of the users), discussed in further detail below. In some examples, the approved content may be pre-processed and stored in the controlled content repository 102 and provided to the multichannel processing engine 108 and the customer relationship management subsystem 104 during a webinar. In other examples, the customer relationship management subsystem 104 may have a content management subsystem and may provide the approved content. The customer relationship management subsystem 104 may store event related data, e.g., a link to approved content in the controlled content repository 102, an attendee list, a speaker list, and webinar tracking information, as will be described in detail below.

In this embodiment, the customer relationship management subsystem 104 is capable of communication with multiple sources through the customer relationship management server 106 or through other channels to maintain a current and accurate collection of information regarding customer accounts. The interface with the multiple sources can be, for example, through an Applications Programming Interface or API, as the API interface will allow compatibility with a flexible array of third-party provider servers. The information being updated may include, but is not limited to, licensing information, area of practice, and location of the various customer contacts. In this manner, the customer relationship management subsystem 104 pulls the approved version of what represents an account or physician, which then pulls from multiple networks to ensure that the information regarding an account is up-to-date.

With further reference to the customer relationship management subsystem 104, this system may be a cloud-based customer database that provides a central access to store and distribute consistent data across customer companies as well as their possible third-party partners and agencies that are used to keep this data updated. This system can provide standard data formats and provide an easy and automated way for customers to have access to coordinated and frequently updated CRM data and to use that coordinated data for sending approved electronic communications, e.g., webinar invitations, in accordance with the system described herein.

In an embodiment, the multichannel processing engine 108 is responsible for combining the customer account information from the customer relationship management subsystem 104 with content available from the controlled content repository 102. Within the customer relationship management subsystem 104, customer accounts may be assigned a set of alignment rules which determine specific pieces of content available for use from the controlled content repository 102. The multichannel processing engine 108 may apply these rules and supply the user with a list of approved email templates and pieces of content that may then be used to construct an approved email communication (e.g., a webinar invitation) and shared during a webinar.

An event management controller 130 may control the process to be described with FIG. 3 below, including getting an event approved, sending webinar invitations, starting a webinar and collecting data to update the CRM subsystem 104 during the webinar. The event management controller 130 may store event related information, such as information about attendees and speakers, event content, and event details. It may be coupled to a teleconference controller 131 to communicate event related information, schedule events, generate event invitations and render webinars.

Executable code comprises computer readable instructions stored on the computer readable medium (the code storage medium 120). The executable code storage 120 is in communication with the various computing machines in the system 100 such as the customer relationship management server 106 and the multichannel processing engine 108. The same or another executable code storage 120 may be accessed by the previously described components of the controlled content repository 102 for providing separate computer readable code for operating upon by processing machines in that system. In all cases, the code is programmed to perform the functions that are described in the present embodiments and/or additional functions according to system design needs.

Communication between the multichannel processing engine 108 and the customer relationship management subsystem 104 may occur via the customer relationship management server 106, which acts as an interface between the two. The customer relationship management server 106 may act solely as an entry and exit point for the customer relationship management subsystem 104. The user may access the multichannel processing engine 108 through either a Web Client 110 or through the mobile apps 112 (such as iOS, Android, Blackberry, or Windows Mobile systems).

FIG. 2 provides a description of the controlled content repository 102 with additional specific applications and interfaces connected thereto. In an embodiment, this controlled content repository 102 is a cloud-based or distributed network based system for consolidating an enterprise's data, oftentimes integrating multiple content repositories in an enterprise into a single system having coordinated control, measuring, and auditing of data creation, access and distribution.

In an embodiment of the controlled content repository 102 for the life sciences industry, as illustrated in the figure, this repository 102 can include specific data collections for the following areas and/or business process-specific front-end applications 204:

The Research & Development (R&D) front end application 208 provides for an aggregation of materials in support of research and initial clinical trial submissions through building organized and controlled content repositories within the controlled content repository 102. Elements that can be stored, organized, and managed through this front end include submission bills of materials, Drug Information Association (DIA) reference models support, and submission-ready renderings. This front end 208 is designed to provide an interface to the controlled content repository 102 whereby researchers, contract research organizations (CROs), and other collaboration partners can access and/or distribute content through a single controlled document system.

The clinical trials front-end application 210 provides for faster and more organized access to trial documents and reports, while supporting seamless collaboration between sponsors, CROs, sites, investigators and other trial participants. Specific features both ease study and site administration as well as support the DIA trial master file (TMF) reference model. Having this front-end application providing access to the controlled content repository 102 further provides for efficient passing off of controlled content repository content between this phase and other phases of the life sciences development process.

The manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the controlled content repository 102 whereby it can be assured that the related documents are not distributed in contravention of law and company policy.

The medical communications application 214 provides for communications with medical facilities, including call center access, integration, and interface functionality. Particular access control features and metadata associated with this application 214 include expiration and periodic review elements, multi-channel support, global documents and automatic response package generation through the controlled content repository 102.

The marketing and sales application 216 provides an end-to-end solution for the development, approval, distribution, expiration and withdrawal of promotional materials. Specific features include support for global pieces, approved Form FDA 2253 (or similar international forms) form generation, online document, content to be shared during a webinar, and video annotation, and a built-in digital asset library (DAL). Again, the communications may be through the controlled content repository 102.

In disclosed embodiments, there are provided a number of back-end system applications 220 that provide for the management of the data, forms, and other communications in the controlled content repository. For example, the back-end systems applications 220 may include a regulatory compliance engine 222 to facilitate regulatory compliance, including audit trail systems, electronic signatures systems, and system traceability to comply with government regulations, such as 21 CFR Part 11, Annex 11 and GxP-related requirements. The regulatory compliance engine 222 may include processors for developing metadata surrounding document and project folder accesses so from a regulatory compliance standpoint it can be assured that only allowed accesses have been permitted. The regulatory compliance engine 122 may further includes prevalidation functionality to build controlled content in support of installation qualification (IQ) and/or operational qualification (OQ), resulting in significant savings to customers for their system validation costs.

In further disclosed embodiments, the back-end systems 220 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the controlled content repository 102.

In further disclosed embodiments, the back-end systems 220 can include an administrative portal 226 whereby administrators can control documents, properties, users, security, workflow and reporting with a simple, point-and-click web interface. Customers also have the ability to quickly change and extend the applications or create brand new applications, including without writing additional software code.

In further disclosed embodiments, the back-end systems 220 may include a search engine 228 whereby the controlled content repository 102 can deliver simple, relevant and secure searching.

In providing this holistic combination of front-end applications 204 and back-end system applications 220, the various applications can further be coordinated and communicated with by the service gateway 230, which in turn can provide for communications with various web servers and/or web services APIs 113. Such web servers and/or web services APIs 113 can include access to the content and metadata layers of some or all of the various applications 204 and systems 220, enabling seamless integration among complementary systems.

In the context of the described embodiments, the particular features and capabilities integrate with the other elements of the event management system 100 such that particular features are usable within the various user screens. For example, and without limitation to any other possible combination of features, in the below-described description of a webinar in the life science industry, the above-described search portal can be used to search for approved content within the controlled content repository 102 which may be then be shared during a webinar. And the synergy of combining these particular systems is that the generation of the controlled content can be done in a controlled fashion such that the approved content can be sent to customers with greater confidence in the integrity of the data being sent.

Figure 3A:
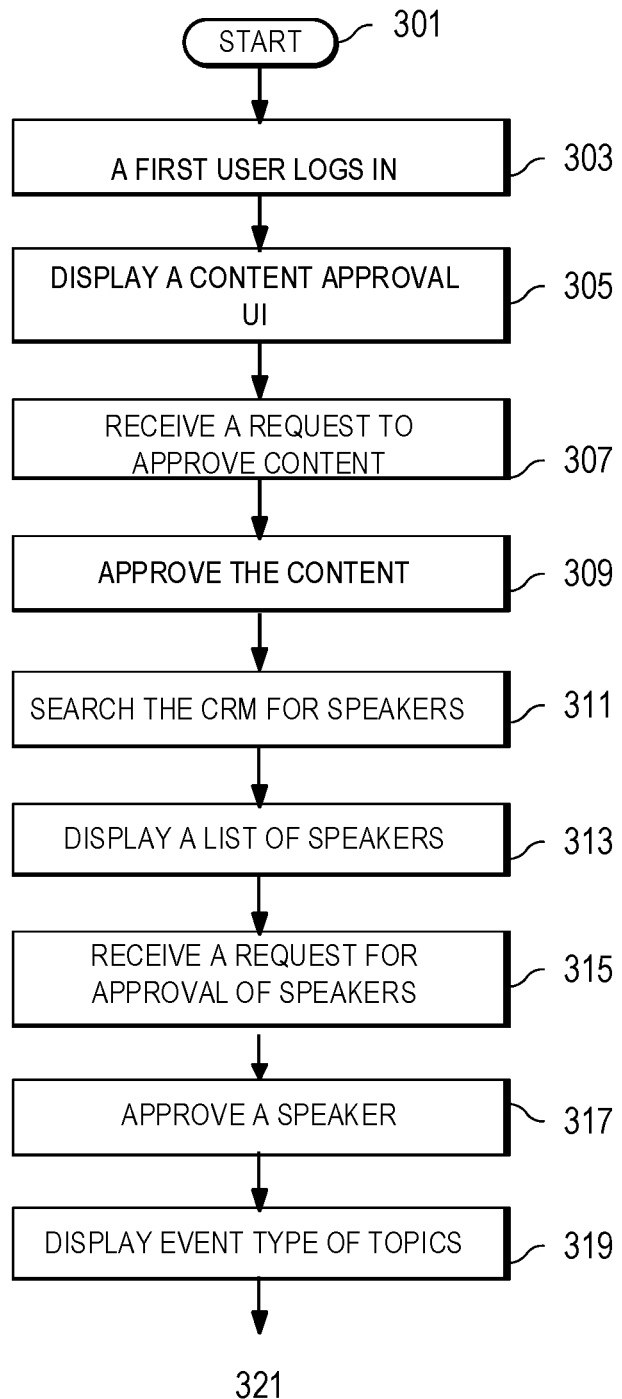
FIGS. 3A, 3B and 3C illustrate a flowchart of a method for managing events.
Figure 3B:
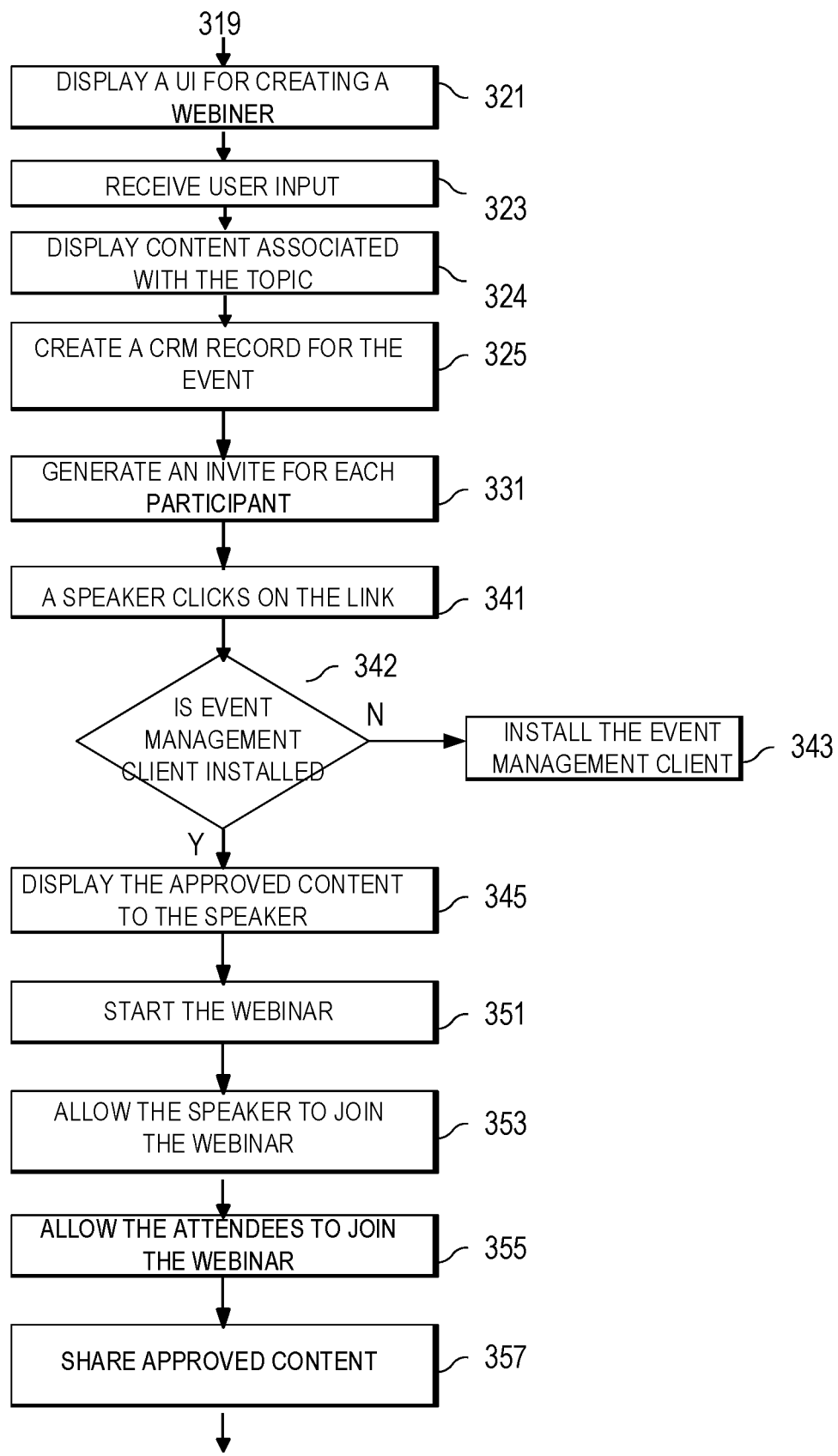
Figure 3C:
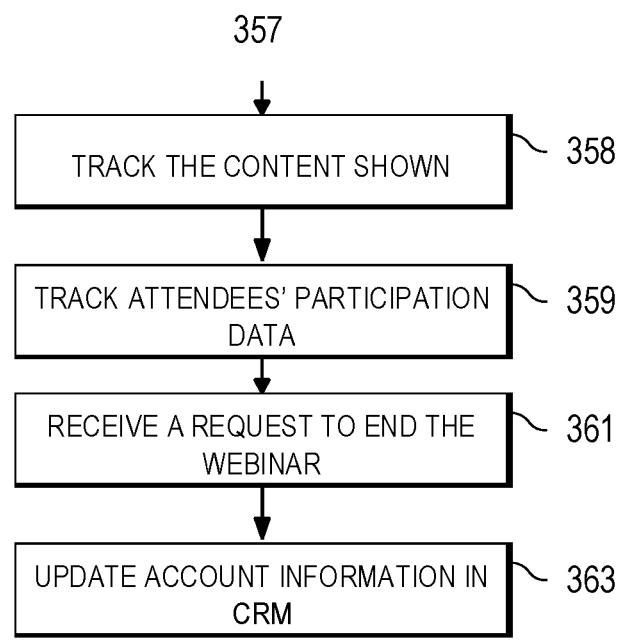

FIGS. 3A, 3B and 3C illustrate a flowchart of a method for managing a life science event according to one embodiment of the present invention. The process may start at 301.

At 303, a first user may login to the event management system 100. The first user may be an employee of a pharmaceutical company.

At 305, a content approval user interface may be displayed so that the first user may submit a request for approval of content for a life science event. If the pharmaceutical company wants to have some events for the year, it may decide the key topics to cover, and work with digital agency to develop the content to share.

A request to get the content approved may be received on the content approval user interface at 307.

At 309, the content may be approved by a second user, e.g., the pharmaceutical company's lawyer, and stored in the controlled content repository 102.

At 311, a request to search the CRM subsystem 104 for physicians, or other health care professionals ("HCP"), specialized in the event topic may be received from the first user.

At 313, a list of physicians specialized in the event topic may be returned from the CRM subsystem 104 and displayed.

At 315, a request for approval of one or more of the physicians in the list to be speaker(s) of the approved event may be received.

At 317, one or more physicians may be approved as speakers of the event in response to the user request.

At 319, event types and event topics may be displayed so that the first user may choose those that the content applies to. The event types and content may automatically come from the CRM subsystem 104. Other properties associated with the event may be displayed for the first user to choose those that the content applies to as well, e.g., geographic locations, products, and countries.

In one implementation, the event management system 100 is built on the CRM system and the content is stored in the controlled content repository 102. When the user is in the CRM system and created a new topic, or a new event type, the new topic and/or new event type may be automatically pushed to the controlled content repository 102. The content in the controlled content repository 102 may be associated to the topic or event type based on, e.g., relevancy indicated by metadata. When the user is in the controlled content repository 102, and has his/her content, he/she may be able to choose which event types, and/or topics this content is related to. In one implementation, the multichannel processing engine 108 may bring the content in the controlled content repository 102 to the CRM subsystem 104 and associate the content to the event. In one implementation, the controlled content and event may be automatically associated in the CRM subsystem 104.

In one implementation, rules for associating the content to the right event and topic may be built up in the multichannel processing engine 108. One example of the rule may be, e.g., when an event is about this topic, use this content. Thus, when a user creates an event and provides event type of topic, the CRM server 106 may check the rules and pull the right content.

At 321, a user interface 400 may be displayed for the first user to create a webinar for the event. As shown, the user interface 400 may have areas for collecting information of the webinar, e.g., event name, event type, start time, end time, topic, speakers, attendees and estimated attendance. In one implementation, a list of speakers specialized on the topic may be obtained from the CRM subsystem 104 and displayed for the user to choose one or more for his event.

At 323, user input may be received on the user interface 400. In one implementation, the first user may search the CRM subsystem 104 to choose attendees of the event.

At 324, controlled content associated with the topic may be displayed for the user so that he/she can choose the content for his/her event.

At 325, when the user clicks save, a record may be created in the CRM subsystem 104 for the event which may include information about its name, type, start time, end time, topic, speakers, attendees, type, and related controlled content.

At 331, an invitation may be generated for each speaker and attendee and sent out. The speaker and attendee contact information may be obtained from the CRM subsystem 104, and the invitation may be an email generated by the multichannel processing engine 108.

In one implementation, a unique identifier may be generated for each recipient and included in his/her invitation. In one implementation, the unique identifier may be a unique URL for each recipient.

In one implementation, the invitation may be sent via an approved email generated by the approved email generation controller 109, as described in U.S. Pat. No. 9,055,023, entitled System and Method for Controlling Electronic Communications and issued on Jun. 9, 2015, which is hereby incorporated by reference herein for all purposes.

Recipients may receive their invitations, including the unique links, in their inboxes. When a speaker clicks on his/her link at 341, it may be determined if the event management client is installed on his/her device at 342.

If not, it may be installed at 343.

Figure 5:
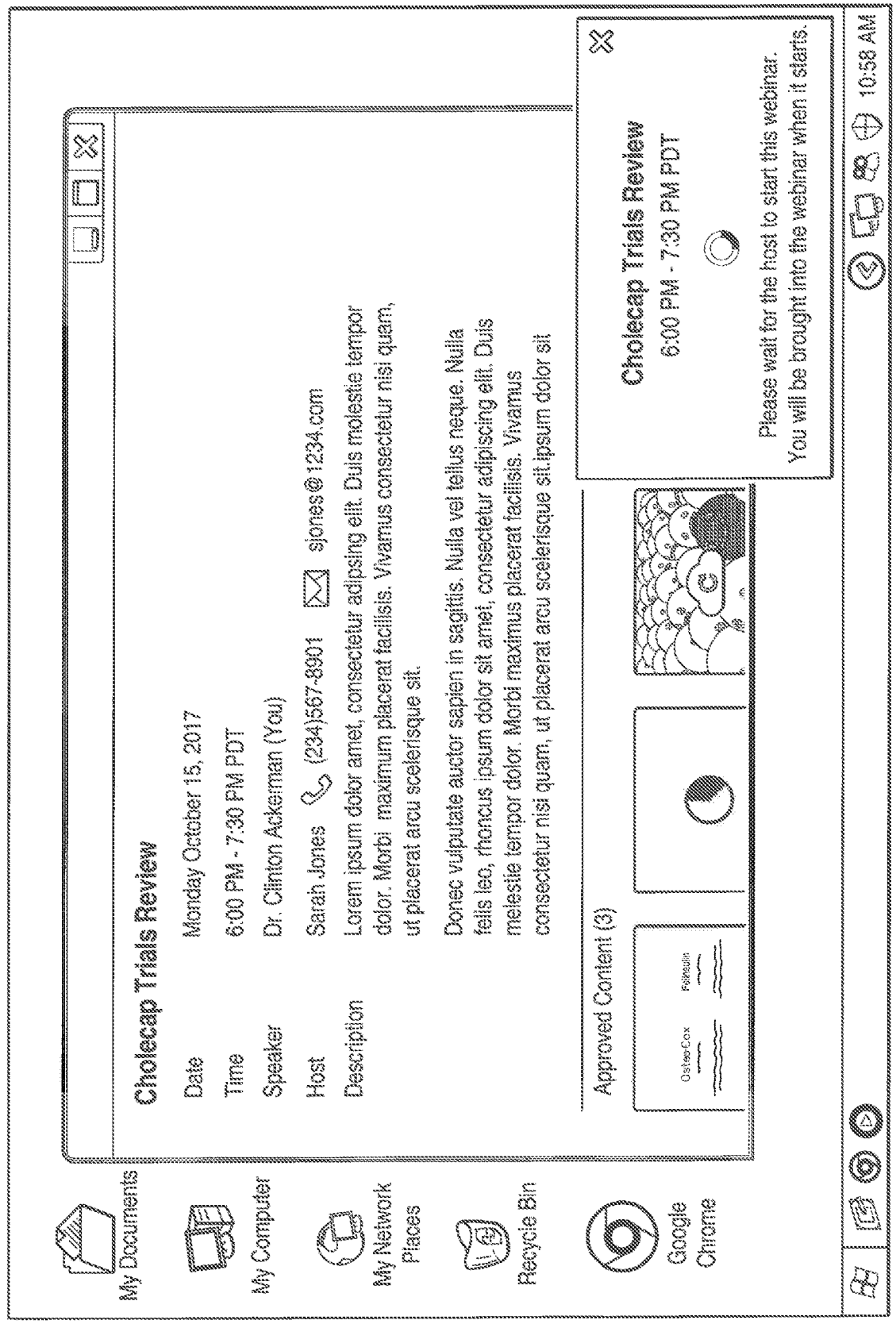
FIG. 5 illustrates an example of an information screen for an event displayed to a speaker.

When the event management application is installed on a speaker's device, at 345, an information screen for the event may be displayed, which may provide the speakers information such as time and name of the event, and its description, as shown in FIG. 5. The information screen may also include any presentation that is approved for this event. The speaker may click on that presentation, download it, and then practice the content.

In one implementation, when a new version of the content is uploaded, or the current version is updated, an indicator may be displayed to indicate that a new version is available, so that the user can be prompted to download the new version of the content. The content may be coming from the controlled content repository 102. The content management server 101 may check when the user loads the event and the version of the content he/she has. If the version on his/her device is not the same as the latest version, the speaker may be informed to get an update. So before the event, the speaker can practice, and download new version of the content that is needed. In one implementation, when a change is made to the content in the controlled content repository 102, the multichannel processing engine 108 may pick up the change, and push it to the CRM subsystem 104 and the event management client on the speaker's computing device. Consequently, the speaker can get the latest version of the controlled content, and only the latest version of the controlled content will be shared.

On the day of the event, the first user may start a webinar of the event at 351. At 353, the speaker may join the webinar of the event.

At 355, the attendees may join the webinar of the event.

At 357, the speaker may start to share the approved content of the event. In one implementation, when a participant clicks on "share screen", the event management controller 130 will only allow the speaker to share the latest approved version of content. If the speaker has an old version of the content, the event management controller 130 may give him/her a chance to update to the newest version.

In one implementation, when the speaker selects the presentation and starts to share a slide, the slide sorter may be displayed on the side on the screen shared to make it easy for the speaker to move between slides.

At 358, the event management controller 130 may track the content shown, including which slide is showing, for how long, and the order of the slides. The data may be stored in the controlled content repository 102 or the CRM subsystem 104 for auditing purposes. For example, the life science industry is very strict about having the right content displayed, including having the latest version of approved content displayed, and making sure that the correct slide was shown for the proper amount of time. With slide tracking, the system 100 may automatically store data that says, e.g., the speaker spent 3 minutes on the side effect slide and 2 minutes on the dosing slide.

At 359, the event management controller 130 may track the attendees' participation data, e.g., their join and leave times, and store the data in the controlled content repository 102 or the CRM subsystem 104.

The first user may end the webinar at 361.

At 363, the participants' account information in the CRM subsystem 104 may be updated. In addition to information of the webinar, e.g., its topic, time and location, the updates for an attendee may include when he/she joined, when he/she left and content he/she watched, the updates for a speaker may indicate that he/she spoke at the webinar, and the content he/she shared.

The flowcharts do not mean to limit the sequence of the steps.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, the multichannel processing engine 108 is shown to communicate with only one customer relationship management subsystem 104 in the drawings, but it may communicate with more customer relationship management subsystems. For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

In all descriptions of "servers" or other computing devices herein, whether or not the illustrations of those servers or other computing devices similarly show a server-like illustration in the figures, it should be understood that any such described servers or computing devices will similarly perform their described functions in accordance with computer-readable instructions stored on a computer-readable media that are connected thereto.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

The approved content may be in any format, e.g., text, audio, video, picture, multimedia, or PDF.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A machine-implemented method for event management, the method comprising:

establishing a controlled content repository, the controlled content repository being securely and controllably accessed;

establishing an access protocol for the controlled content repository;

receiving a request for approving a first item of content to be shared during a first event;

receiving an approval for sharing the first item of content during the first event;

storing the first item of approved content to be shared during the first event within the controlled content repository, whereby the first item of approved content to be shared during the first event is stored in the controlled content repository according to the access protocol and whereby the access protocol comprises at least one set of alignment rules for determining that the first item of approved content to be shared during the first event within the controlled content repository can be made available to a first customer attending the first event;

associating the first item of approved content to be shared during the first event within the controlled content repository with a first value of a first event property of the first event from an information management system;

receiving a request for searching for a speaker of the first item of approved content in the information management system, and returning information of a first speaker and a second speaker: and receiving an approval for the first speaker as an approved speaker of the first item of approved content, and associating the first speaker with the first item of approved content.

2. The method of claim 1, wherein the information management system is a customer relationship management (CRM) system or a closed loop marketing (CLM) system.

3. The method of claim 1, further comprising: receiving a request for approving content to be shared during the first event on a first user interface.

4. The method of claim 1, further comprising: receiving the first value of the first event property, and determining that the first value of the first event property and the first item of approved content are relevant.

5. The method of claim 1, further comprising: generating a first rule indicating that when an event has the first value of the first event property, recommending the first item of approved content as content to be shared during the event.

6. The method of claim 1, wherein the first event property is a topic of the event.

7. The method of claim 1, wherein the first event property is a geographic location.

8. The method of claim 1, wherein the first event property is a product.

9. The method of claim 1, further comprising: receiving a request for the first event, and determining that the first event has the first value of the first event property.

10. The method of claim 9, further comprising: providing the first item of approved content for selection after a determination that the first item of approved content is associated with the first event, and is approved to be shared with during the first event.

11. The method of claim 9, further comprising: sharing the first item of approved content with a first attendee and a second attendee of the first event.

12. The method of claim 9, further comprising: recommending the first approved speaker of the first item of approved content as a speaker of the first event.

13. The method of claim 12, further comprising: sending an invitation to the first approved speaker, wherein the invitation is an electronic message and comprises a link unique to the first approved speaker.

14. The method of claim 12, further comprising: determining that the first approved speaker's computing device does not have an event management client, and installing the event management client on the first speaker's computing device.

15. The method of claim 1, further comprising: determining that the first item of approved content in the controlled content repository is updated, and informing a speaker selected for the first event.

16. The method of claim 1, further comprising: tracking display data of the first item of approved content during the first event, including if a first part of the first item of approved content is displayed.

17. The method of claim 16, wherein the display data further comprises display time of the first part of the first item of approved content.

18. The method of claim 1, further comprising: tracking participation data of an attendee of the first event, wherein the participation data comprises the attendee's join time and leave time.

* * * * *